US008441685B2

(12) United States Patent
Wu et al.

(10) Patent No.: US 8,441,685 B2
(45) Date of Patent: May 14, 2013

(54) OPTIMAL SPOT COLOR RECIPES USING VARIABLE GCR PROFILES

(75) Inventors: Wencheng Wu, Webster, NY (US); Edul N. Dalal, Webster, NY (US); Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 347 days.

(21) Appl. No.: 12/902,669

(22) Filed: Oct. 12, 2010

(65) Prior Publication Data

US 2012/0086959 A1  Apr. 12, 2012

(51) Int. Cl.
H04N 1/40 (2006.01)

(52) U.S. Cl.
USPC ............................. 358/2.1; 358/504; 358/527

(58) Field of Classification Search ............ 358/1.9, 358/2.1, 400, 500, 406, 504, 527, 515–521
See application file for complete search history.

(56) References Cited

U.S. PATENT DOCUMENTS

| | | | |
|---|---|---|---|
| 7,259,893 B2 * | 8/2007 | Falk et al. ...................... 358/2.1 |
| 7,495,804 B2 | 2/2009 | Rozzi | |
| 7,768,672 B2 | 8/2010 | Gil et al. | |
| 2008/0043263 A1 | 2/2008 | Hancock et al. | |
| 2008/0252931 A1 | 10/2008 | Mestha et al. | |
| 2009/0296107 A1 | 12/2009 | Mestha et al. | |
| 2009/0296112 A1 * | 12/2009 | Gil et al. ........................ 358/1.9 |

OTHER PUBLICATIONS

Wu et al., "Image Quality Performance For A Color Marking Device", U.S. Appl. No. 12/727,692, filed Mar. 19, 2010.
Wu et al., "Updating An Image Quality Metric Database To Account For Printer Drift", U.S. Appl. No. 12/781,988, filed May 18, 2010.
Dalal et al., "Color Mapping Determination For An N-Color Marking Device Based Upon Color Stability", U.S. Appl. No. 12/727,760, filed Mar. 19, 2010.
Dalal et al., "Color Mapping Determination For An N-Color Marking Device Based Upon Image Spatial Noise Defects", U.S. Appl. No. 12/727,791, filed Mar. 19, 2010.
Mestha et al., "Reducing Noise Induced By Color Mixing Spot Color Recipe Search", U.S. Appl. No. 12/581,566, filed Oct. 19, 2009.
Mestha et al., "Recent Developments Towards Control-Based Color Profiling Technology", NIP25: International Conference on Digital Printing Technologies and Digital Fabrication, vol. 25, pp. 350-353, (2009) ISBN/ISSN: 978-089208-2872.

* cited by examiner

*Primary Examiner* — Thomas D Lee
*Assistant Examiner* — Stephen M Brinich
(74) *Attorney, Agent, or Firm* — Philip E. Blair; Fleit Gibbons Gutman Bongini & Bianco P.L.

(57) ABSTRACT

What is disclosed is a novel system and method for obtaining optimum CMYK values for spot colors, with significantly lower computational effort, by using a set of printer profiles with different pre-computed GCR strategies. Various versions are discussed on how to utilize and/or choose among these profiles for each spot color. The present invention is applicable to spot color emulation for CMYK as well as N-color printing, and can be used to optimize one or more image quality attributes, including graininess, mottle, color stability, ink cost, etc. Various embodiments are disclosed.

18 Claims, 7 Drawing Sheets

OPTIMAL SPOT COLOR RECIPES USING VARIABLE GCR PROFILES

TECHNICAL FIELD

The present invention is directed to systems and methods for deriving spot color recipes for use in spot color emulation for N-color printing in direct color marking engines.

BACKGROUND

To meet customer demand, the commercial printing industry requires the capability of producing spot colors and color images accurately and consistently. In a typical four color printer, there are numerous combinations of CMYK, especially for colors near the neutral axis that can produce the same color. This is called degeneracy in printers, offered by the addition of K separation. The number of combinations available to produce the same color goes down dramatically as we approach the boundary. Particularly, the appearance of spot colors might result in a non-smooth rendering because of the differences in halftone structures when just min-GCR or max-GCR solutions are used. When rendering a given color (Lab) on a CMYK printer, such as for spot color emulation, there is a range of CMYK values that will produce the desired Lab value. The available CMYK range is large for some colors (e.g., midtone neutrals) and small or zero for others (e.g., saturated colors). The available range is significantly greater for N-color systems (N>4). Although each CMYK value in the range will produce the desired Lab value, the printed spot colors with that recipe can differ widely in other attributes, such as graininess, mottle, color stability, ink cost, etc. Currently, the CMYK values are commonly chosen by applying a GCR strategy. Typically, this profile approximates the max-GCR case, i.e., a CMYK value is selected at or near the one containing the most K. This is often done because ink cost is a minimum for the max-GCR case, and because there is a common belief that this provides the best color stability. On the other hand, max-GCR can, for many colors, provide very poor uniformity (e.g., high mottle and graininess). Consequently, it is desirable to pick the CMYK recipe from among available recipes to optimize one or more of these attributes (graininess, mottle, color stability, ink cost, etc.). Methods for performing this optimization are computationally intensive since such techniques involve computing all possible CMYK recipes for a given color and then selecting among these.

Thus, depending on the choice of CMYK recipe, appearance of spot colors may be noisy due, for example, to the differences in uniformity and in contrast between the various separations. In spot color tests on several printers, proper selection of the C, M, Y and K separations has been shown to suppress the noise apparent in the prints, making them appear smooth. An optimized CMYK recipe is considered useful when it not only produces accurate color but also renders colors that appear smoother (less noisy). The term 'smoothness' broadly refers to various other smoothness related image quality parameters. The acronym NMF (Noise Mottle Frequency) refers to an image quality metric, which is a measure of 'smoothness'.

Accordingly, what is needed in this art are computationally efficient methods for determining spot color recipes for use in spot color emulation for N-color printing, which produce spot colors which are not only accurate in color but are also smooth.

INCORPORATED REFERENCES

The following U.S. patents, U.S. Patent Applications, and Publications are incorporated herein in their entirety by reference.

"*Image Quality Performance For A Color Marking Device*", U.S. patent application Ser. No. 12/727,692, to Wu et al.

"*Updating An Image Quality Metric Database To Account For Printer Drift*", U.S. patent application Ser. No. 12/781,988, to Wu et al.

"*Color Mapping Determination For An N-Color Marking Device Based Upon Color Stability*", U.S. patent application Ser. No. 12/727,760 to Dalal et al.

"*Color Mapping Determination For An N-Color Marking Device Based Upon Image Spatial Noise Defects*", U.S. patent application Ser. No. 12/727,791 to Dalal et al.

"*Method, Apparatus And Systems To Retrieve GCRs from Historical Database*", U.S. Publication No. 20090296107 to Mestha et al.

"*Reducing Noise Induced By Color Mixing Spot Color Recipe Search*", U.S. patent application Ser. No. 12/581,566 to Mestha et al.

"*Image Output Color Management System And Method*", U.S. Publication No. 20080252931 to Mestha et al.

"*Spot Color Control System And Method*", U.S. Pat. No. 7,768,672 to Gil et al.

"*System And Method For Automated Spot Color Editor*", U.S. Publication No. 20080043263, to Hancock et al.

"*Recent Developments Towards Control-Based Color Profiling Technology*" by Lalit K. Mestha, Alvaro E. Gil, Yao Rong Wang, Marty S. Maltz, and Raja Bala, (Xerox USA), NIP25: International Conference on Digital Printing Technologies and Digital Fabrication, vol. 25, pp. 350-353, (2009) ISBN/ISSN: 978-089208-2872.

BRIEF SUMMARY

What is disclosed is a novel system and method for deriving optimum CMYK values, with significantly reduced computational effort, by using a set of printer profiles with different pre-computed GCR strategies. Various embodiments are disclosed herein on how to choose among these profiles for each spot color. The present method is applicable to spot color emulation for CMYK as well as N-color printing, and can be used to optimize one or more of a wide variety of attributes, including graininess, mottle, color stability, ink cost, etc.

In one example embodiment, the present method for spot color emulation in a color marking device involves performing the following. First, at least one spot color of interest is identified for which a spot color recipe is intended to be determined for a target marking device. A performance attribute of interest is then selected. The performance attribute can be one or more image quality attributes associated with any combination of, for example, graininess, mottle, banding, streaking, or temporal color variation. The performance attribute can further include ink cost reduction. A plurality of destination profiles comprising distinct GCR strategies are then received. Each of the profiles defines a corresponding candidate recipe and each recipe defines a device-dependent representation of the spot color. The distinct GCR strategies can be distributed, for instance, between a minimum and a maximum GCR strategy. A mapping is also received, this mapping defining a relationship between a device-dependent colorant combination and the selected performance attribute. In one embodiment, the mapping is in the form of a look-up table. From among the candidate recipes, at least one recipe is determined which optimizes the performance attribute for the spot color of interest. This determination is based upon the mapping. Determining the recipe comprises selecting, from the candidate recipes, that recipe which yields an optimum value for the selected performance attribute. In one embodiment, determining the recipe involves interpolating between candidate recipes to determine a new recipe which yields an optimal value of the performance attribute. In another embodiment, determining the recipe involves identifying, from the candidate recipes, a subset of recipes, each of which have an image quality performance attribute value which at least meets a pre-determined threshold and then selecting, from the identified subset of candidate recipes, at least one recipe which has a minimum ink cost. Alternatively, instead of selecting the nearest one of the candidate recipes, an interpolation is performed among the subset of recipes to determine a new recipe which has a minimum ink cost. Optionally, after determining a recipe, an iterative method can be employed to refine the recipe to produce a more accurate spot color recipe. Such an iterative method would include iteratively printing, measuring, and refining the recipe to produce a more accurate spot color recipe. The resulting refined recipe is then used to emulate the identified spot color on the target marking device. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
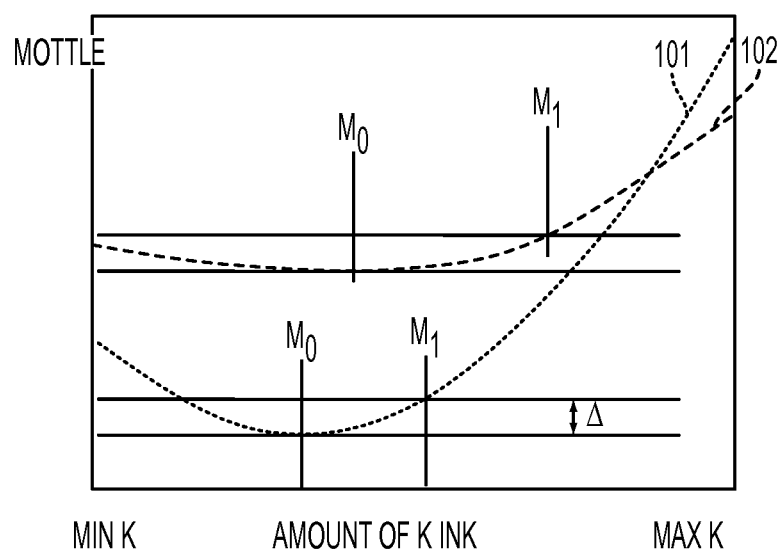
FIG. 1 illustrates an alternative wherein an interpolation is performed among the results from the existing destination ICC profiles instead of just picking the nearest one.

What is disclosed is a novel system and method for deriving optimum CMYK values, with significantly reduced computational effort, by using a set of printer profiles with different pre-computed GCR strategies. The teachings hereof are applicable to spot color emulation for CMYK as well as N-color printing in xerographic and color marking devices.

It should be understood that one of ordinary skill in this art should be readily familiar with the various aspects of spot colors including iterative methods and interpolation techniques for determining a spot color recipe. The skilled practitioner would also be familiar with various image quality attributes, as defined herein. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

A "device-independent color space" is a color which is defined by any standard color space which is commonly used to define or describe that color, e.g. CIE XYZ, CIE L*a*b*, CIE L*u*v*, sRGB etc.

A "device-dependent color" is a color which is defined by a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer. The non-standard raw RGB space is also a device-dependent color space since the rendering of an RGB image could appear differently from one model of a CRT monitor to another model of a CRT monitor.

A "color separation" refers to an individual separation corresponding to one of the colorants of a target marking system. For example, there are 4 separations: C, M, Y, K for a 4-color CMYK printer. Combinations of all color separations can be used to produce a range of colors by the target marking system. A "single color separation" or "single-separation color" refers to a color specified with only one of the color separations for a target marking system. For example, for a CMYK printer, a C-only test patch is a single-separation color test patch. A "multi-separation color" refers to a color specified with more than one of the color separations for a target marking system. For example, for a CMYK printer, a red test color is a multi-separation color test patch, using combinations of at least the M and Y separations at some pre-determined levels.

A "profile" is a set of data that characterizes a color input or output device, or a color space, according to standards promulgated by the International Color Consortium (ICC). The ICC specification is a vendor-neutral cross-platform color management standard created by a group of industry color experts to improve color workflow and is implemented in the ICC profile format. ICC standards permit the exchange of output device characteristics and color spaces in the form of metadata. Briefly, the ICC specification divides color devices into three relatively broad categories: input devices, display devices, and output devices. For each device category, a series of color transformations are included that perform the conversion between different color spaces. A "source profile" provides a means for translating a color space of a source device to a standardized color space. A "destination profile" provides a means for translating a standardized color space to the color space of a destination device. For example, a destination profile for a color printer provides a set of colorant values (e.g., CMYK) necessary to produce a given color (e.g., L*a*b*). For a 4-color (CMYK) printer, this involves a 3-to-4 transformation (L*a*b* to CMYK) which is "underdetermined". Thus, for many colors there are, in general, multiple solutions, i.e., more than one CMYK combination that produces a given L*a*b*. Even more combinations are possible when more than 4 colorants are used (e.g., CMYKOV).

A "printer profile" is a printer model which converts from one color space to another color space for a target marking system. A printer model can have the form of a look-up table (LUT) such as a 4-D LUT for a CMYK printer, or a parameterized fitted function such as a polynomial that relates inputs in device-dependent color space to outputs in device-independent color space. For CMYK color space as the target device-dependent color space and L*a*b* color space as the output device-independent color space, updating the forward printer model includes, for example, for each of a selected number of the nodes: (a) printing a patch using the specified CMYK components; (b) measuring the color L*a*b* of this printed patch; (c) compiling the relationship between this input CMYK specified and its corresponding measured output L*a*b* for each node; and finally (4) storing these compiled relationships of all the nodes in the form of a LUT. This LUT can now be used to map any CMYK in device-dependent color space to its predicted output L*a*b* in the device-independent color space for a target marking system, and is thus the printer model for this target marking system. A "forward printer model" converts values in a device-dependent color space to values in a device-independent color space for a target marking system. An "inverse printer model" converts values in a device-independent color space to values in a device-dependent color space for a target marking system.

A "spot color", as used herein, refers to any color generated by a single ink, which can be printed as a single separation. Spot colors are often used for company logo colors. They can also be used for large background areas, which can be very color critical. Consistent and accurate color in spot colors may determine the difference between success and failure in meeting customer requirements. Spot color classification systems include: Pantone®, Toyo, DIC, ANPA, GCMI, and HKS.

A "spot color of interest" refers to one or more spot colors in a library of spot colors. A spot color of interest is also intended to include non-standard spot colors that may be defined by hardcopy samples which may have been printed with any known printing technology such as, for example, offset lithography, gravure, flexography, xerography, inkjet, etc.

An "emulated spot color" is a process-color equivalent or approximation of a true spot color. Emulation can be done in standard 4-color systems (e.g., CMYK) or in extended-gamut systems (e.g., CMYKOV).

A "spot color recipe" defines the combination of process colors (e.g., CMYK or CMYKOV) which can be used to emulate a spot color. Spot colors in an N-color printing system (N≧4) are typically rendered with a Gray Component Replacement (GCR), since some colors can be rendered by any of several different recipes.

"Gray Component Replacement" or GCR refers, in a 4-color CMYK system, to replacement of an appropriate amount of the C, M and Y separations with an equivalent amount of the K separation.

A "GCR Strategy" refers to a function or mapping which defines the amount of GCR to be applied for any given color. Since a GCR strategy is designed to constrain the amount of the K separation relative to the C, M and Y separations, there is a multiplicity of GCR strategies which can be employed, each of which is equally valid from a colorimetric point of view. A plurality of destination profiles may comprise distinct GCR strategies, with each profile defining a corresponding spot color recipe.

A "performance attribute of interest" broadly defines one or more attributes which affect the color quality performance of a color marking engine. A "performance attribute of interest" may be an image quality attribute, as defined herein further, or some other performance attribute, such as ink cost.

An "image quality attribute" is a mathematical definition for determining a given image quality defect, such as, for instance, graininess, mottle, banding, streaking, and temporal color variation. Example image quality metrics are described in: International Print Quality Standard—ISO/IEC 13660: 2001 which specifies device-independent image quality metrics, measurement methods, and analytical procedures used to describe a quality of an image output from a document reproduction device. As used herein, image quality attributes are any combination of graininess, mottle, banding, streaking, and temporal color variation.

"Graininess" is an image quality attribute which is defined as the aperiodic fluctuation of density at a spatial frequency greater than 0.4 cycles per millimeter in all directions. Other definitions, such as with different spatial frequency ranges and/or measuring fluctuation at different color space (e.g. L* rather than density), exist as well. Methods to quantify graininess are well established.

"Banding" is another image quality attribute which consists of either horizontal or vertical bands, with a period that gradually varies from a minimum to a maximum value, at one or more frequencies. Banding can thus be defined as a 1D image density variation, typically in the process direction. It is often periodic and it can result from errors in the mechanical motion of moving components, such as gears, pinions, and rollers in the paper transport, charging and development subsystems, photoreceptors and their drive trains, or the ROS polygon, within a marking engine.

"Mottle" is another image quality attribute consisting of the irregular distribution of color on an output print intended to be uniform, and may be, for example, due to defective toner transfer from the photoreceptor belt to the image forming surface. Mottle is similar to graininess, but on a larger spatial scale. Various metrics have been developed by vendors, some proprietary, which are used to determine lightness variation of mottle. ISO-13660:2001 defines mottle as the standard deviation of optical density (rather than L*) between $1.27 \times 1.27$ mm$^2$ and $12.7 \times 12.7$ mm$^2$ scale. Xerox, in one embodiment, defines mottle as the standard deviation of L* (together with an optical density correction) between $1.1 \times 1.1$ mm$^2$ and $5.5 \times 5.5$ mm$^2$ scale.

"Streaking" is an image quality attribute consisting of pseudo-random one-dimensional defects that run parallel to the process direction. Streaking defects can arise from a non-uniform LED imager, contamination of the high voltage elements in a charger, scratches in the photoreceptor surface, etc. Graininess and mottle are usually not directionally oriented whereas streaks usually are.

"Color stability" or "temporal color variation" refers to the consistency of color reproduction of a given target marking device. Color instability may be attributed to such factors as, for example, photoreceptor or charging device non-uniformity, variation in temperature or humidity, age of the photoreceptor unit, age of an individual toner color, or other like environmental and/or mechanical factors. In addition, changes in media weight or mechanical alignment of the machine components may result in color-to-color registration errors, which can impact color stability. Various complex control and sensor systems are often employed to improve color stability.

General Discussion

Without loss of generality, we outline the present method for spot color emulation using a CMYK printer and optimizing for the image quality attribute of 'mottle'. It is applicable to xerographic as well as direct marking engines, although the focus may be different for the different technologies. For example, for some xerographic engines, spot colors with reduced mottle may be a priority, while for some direct marking engines reduced graininess may be a priority.

Assume that, for a given color management workflow, there are P destination profiles with distinct GCR strategies. Therefore, there are P transformations (or LUTs) $T_p$, where p=1~P, that can be used to determine each spot color emulation. Let us further assume that there are s spot colors of interest (s=1114 for all Pantone PMS colors) for which the CMYK recipes need to be determined. Let $Lab_i$ where i=1~s, be the target color of the $i^{th}$ spot color. Then, there are P possible cmyk recipes, $T_p(Lab_i)$, each of which can be used to determine the $i^{th}$ spot color. Let Q be the mapping (such as a LUT) for a mottle database M, i.e. Q: cmyk→M. Prior methods fix p for all i without taking Q into account. In fact, p is typically fixed to the destination ICC profile with max-GCR (i.e., use as much K as possible). For a given spot color, colorant recipes corresponding to the device-independent representation (L*a*b*) of the spot color are determined by utilizing each of the set of destination ICC profiles with differing GCR, and then determining an optimum recipe based on the recipes that result from this set. The algorithm is: For the $i^{th}$ entry of the spot color table, the update recipe is $T_{p_i}(Lab_i)$, where $p_i = \arg\min_p Q(T_p(Lab_i))$. In other words, pick the recipe that gives minimal mottle among the p candidate recipes.

Attention is respectfully directed to FIG. 1 which illustrates an alternative embodiment showing a first and second plot 101 and 102, respective. Since it is often desirable to consider additional performance attributes, in this embodiment, rather than simply minimize mottle, a spot color recipe is selected which provides a good balance of various attributes. For example, the lowest-cost recipe will generally be the max-GCR recipe, since much less total toner will be used, and moreover, K toner is usually cheaper than C, M or Y toners. A good balance between mottle and cost can be accomplished by setting some threshold for the maximum mottle allowable, $M_1 = M_0 + \Delta$, where $M_0$ is the minimum mottle achievable for a given spot color, and $\Delta$ is some threshold. For example, a threshold $\Delta=1$ Noise Mottle Frequency (NMF) unit may be set, since an increase of this magnitude is not very perceptible. Then the spot color recipe having the maximum K value that yields a mottle of $M_1$ can be used rather than the minimum mottle of $M_0$ as in the above. This yields a recipe which has a mottle only slightly worse than the lowest possible value while simultaneously reducing the ink cost as much as possible. This can be useful since, in many spot colors, the mottle curve has a very shallow minimum. This alternative is illustrated in FIG. 1 showing that, in many cases, significant ink cost savings (reduction in C+M+Y+K) is possible with very little increase in mottle. This would be especially important for some continuous feed xerographic print engines, for example, wherein a large fraction of the run cost is associated with toner usage.

In one embodiment, instead of optimizing the spot color recipes specifically for each printer, the optimization may be done at the fleet level. For an entire fleet of a given printer model, perform the methods described above for a selected subset consisting of only a few machines. This can be done at the factory. From this, determine the optimum GCR level for each spot color of the collection (e.g., for the entire Pantone PMS set). Then, for any given machine in the field, use a current destination profile with the GCR level appropriate for each spot color. Thus, only a single profile needs to be processed for each spot color, rather than the set of profiles used in the embodiments above. This is applicable only for printers where the mottle transform Q does not change significantly with time but, in such cases, considerable computational simplification can be achieved by this embodiment.

For a given spot color, once the GCR level has been chosen, the recipe (e.g., CMYK) can be further refined to produce a more accurate color, by using known iterative methods such as Automatic Spot Color Editing (ASCE) technology which is well established in this art. Refining the recipe can be done by iterating on the printer model to find a more accurate colorant recipe for a given spot color. Alternatively, iterating on the printer could be used instead. Both methods are well known and are not discussed herein further. The mottle transform Q can be predetermined and captured in a LUT. If desired, this Q LUT can be updated with relatively low effort by using prior methods.

The methods described in any of these embodiments will work even with using just existing ICC profiles generated for the printer for other purposes, for example, a high-K profile normally used for spot color emulation and a moderately low-K profile normally used for images. However, in order to get the full benefit of the teachings hereof, the set of profiles should be chosen to maximize the range of available CMYK values for all input Lab values. A minimum of 3 profiles is desirable, with one at max-GCR, one at min-GCR and one reasonably between them. A larger number p of profiles in the set will result in more accurate results.

Example Flow Diagram

Figure 2:
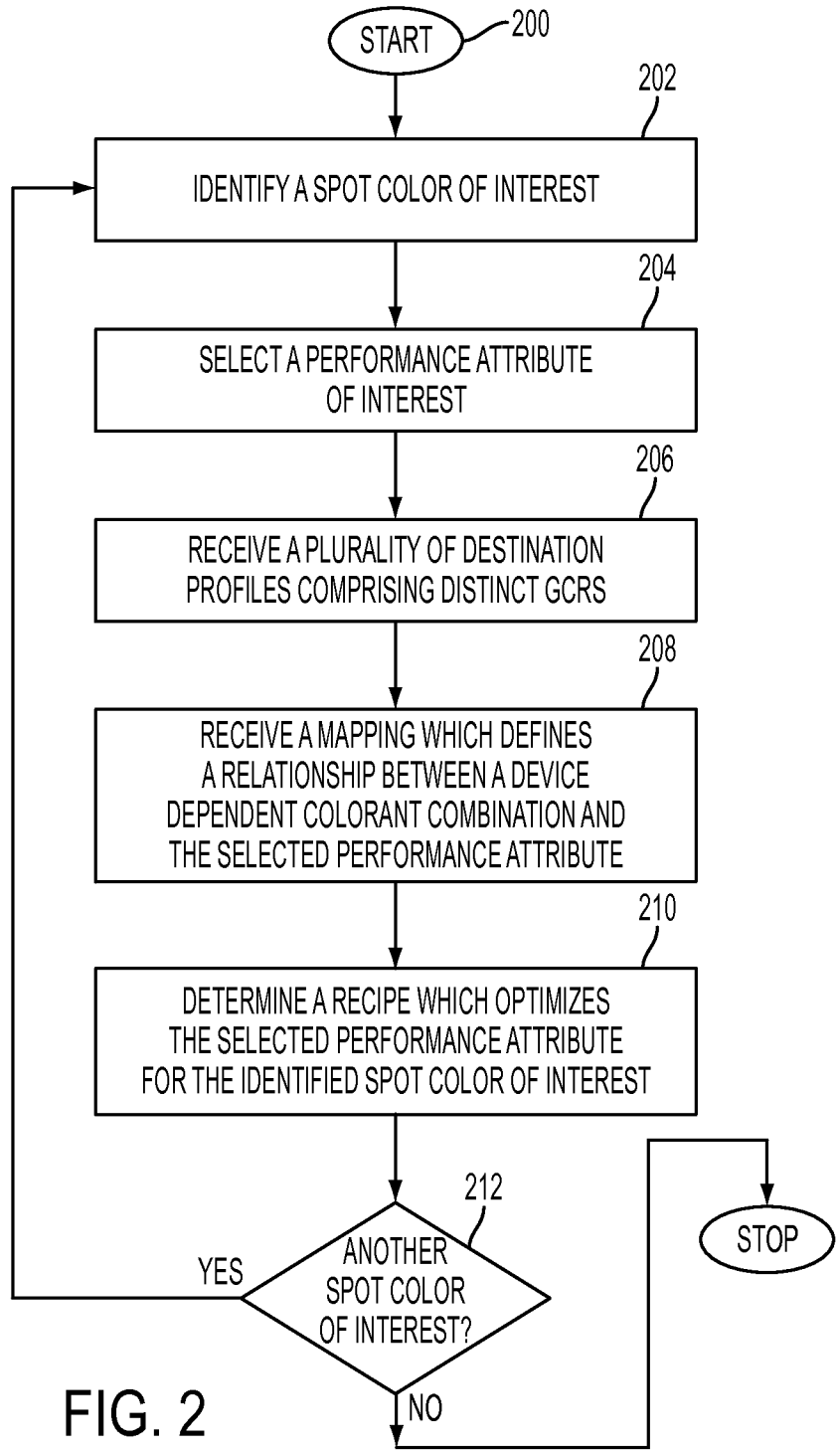
FIG. 2 illustrates one example embodiment of the present method of spot color emulation in a color marking device.

Reference is now being made to the flow diagram of FIG. 2 which illustrates one example embodiment of the present method of spot color emulation in a color marking device. Flow processing begins at step 200 and immediately proceeds to step 202.

At step 202, at least one spot color of interest is identified for which a spot color recipe is intended to be determined for a target marking device. At step 204, a performance attribute of interest is selected. The performance attribute can be one or more image quality attributes associated with any combination of, for example, graininess, mottle, banding, streaking, color stability, or temporal color variation. The performance attribute can further include ink cost reduction. One example device for identifying a spot color of interest and for selecting the performance attribute is shown and discussed with respect to the computer system of the example color management system 300 of FIG. 3. Alternatively, the spot color of interest and/or the performance attribute of interest can be received over a network 303.

At step 206, a plurality of destination profiles comprising distinct GCR strategies are then received. Each of the profiles defines a corresponding candidate recipe and each recipe defines a device-dependent representation of the spot color. The distinct GCR strategies can be distributed, for instance, between a minimum and a maximum GCR strategy.

At step 208, a mapping is received which defines a relationship between a device-dependent colorant combination and the selected performance attribute. In one embodiment, the mapping is in the form of a look-up table. The destination profiles and any of the mappings may be retrieved from a storage device such as database 316 of FIG. 3 or be received from a remote device via a communication link over a network.

At step 210, at least one recipe is determined, from among the candidate recipes, which optimizes the performance attribute for the spot color of interest. This determination is based upon the mapping. In one embodiment, determining the recipe comprises selecting, from the candidate recipes, that recipe which yields an optimum value for the selected performance attribute. In another embodiment, determining the recipe involves interpolating between candidate recipes to determine a new recipe which yields an optimal value of the performance attribute. In another embodiment, determining the recipe involves identifying, from the candidate recipes, a subset of recipes, each of which have an image quality performance attribute value which at least meets a pre-determined threshold and then selecting, from the identified subset of candidate recipes, at least one recipe which has a minimum ink cost. Alternatively, instead of selecting the recipe, an interpolation is performed among the subset of recipes to determine a new recipe which has a minimum ink cost. An iterative method can be employed to refine the recipe to produce a more accurate spot color recipe. Such an iterative method would include, for example, iteratively printing, measuring, and refining the recipe to produce a more accurate spot color recipe. The selected recipe can then be used to emulate the identified spot color on the target marking device. Using the selected recipe includes transmitting or otherwise providing the selected recipe to a target marking device such as printer 318 of FIG. 3. The selected recipe may be stored to storage media or provided to a database or transmitted to a remote device over a network using a communication link.

At step 212, a determination is made whether more spot colors of interest remain to be identified. If so, the processing repeats with respect to step 202 wherein another spot color of interest is identified. If not, the process stops.

Figure 3:
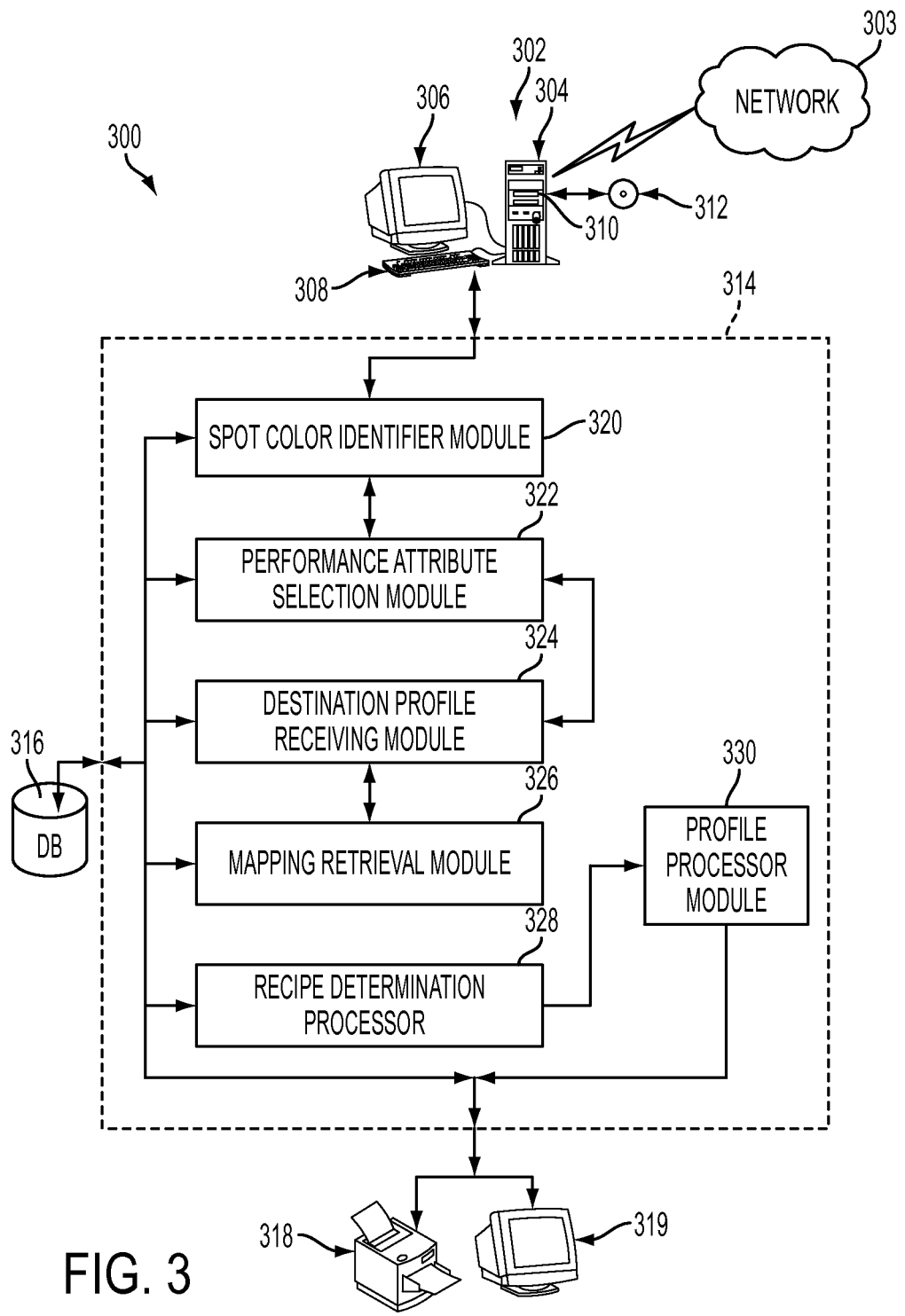
FIG. 3 is a functional block diagram of one example color management system wherein various aspects of the present method as described with respect to the flow diagram of FIG. 2 are performed.

Any or all of the steps of the flow diagram of FIG. 2 may be performed by an image processing system such as that described next with respect to the block diagram of FIG. 3. It should be appreciated that any of the modules of FIG. 3 designate a system component comprised of software and/or hardware designed to perform one or more functions. A module may be implemented using a single software program comprising machine readable program instructions or a single piece of hardware such as an ASIC, electronic circuit, or special purpose processing system such as is shown in FIG. 3. A plurality of modules may collectively perform a given function. Connections between modules include both physical and logical connections. Any or all of the modules described with respect the image processing module may reside, in whole or in part, within workstation 302. It should further be appreciated that the term 'system' includes one or more software and/or hardware modules and may further comprise an operating system, drivers, device controllers, and other apparatuses some or all of which may be connected via a network.

Example Color Management System

Reference is next being made to FIG. 3 which is a block diagram of one example color management system 300 wherein various aspects of the present method as described with respect to the flow diagram of FIG. 2 are performed.

The general purpose color management system 300 is shown generally comprising a computer workstation 302 capable of receiving a user input and providing that selection to image processing module 314 shown comprising a plurality of sub-modules. Computer system 302 generally comprises computer case 304 housing a motherboard, central processor unit (CPU), memory, network interface, storage devices, and a communications link such as a network card to enable communication to remote devices over network 303 such as an Internet. Workstation 302 also includes a graphical display device 306 such as a CRT or LCD monitor. Alphanumeric keyboard 308 and a mouse (not shown) provide a means for a user to make a selection or identification. The workstation includes a Computer program product 312 contains machine readable instructions and other executable program instructions and data for implementing the present method described above with respect to the flow diagram of FIG. 2. The computer program product provides a means for transport and storage of machine readable program instructions for enabling a central processor unit (CPU) to perform various aspects of the present method. The workstation reads the information stored on removable media 312 using R/W storage 310. The computer workstation is connected to remote devices via network 303 or a local area network (not shown) over which values, records, and other data are transmitted and received. Techniques for placing computer workstations in network communication with remote devices over a network are well established. Many aspects of networks and placing devices in communication over a network are commonly understood. As such, a detailed discussion as to the operation of any specific network has been omitted. Suffice it to say, data packets are transmitted by using special purpose servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. One computing device with access to the internet communicates with another computing device with access to the internet using well established communication protocols. Computer 302 may be further capable of executing server software (or housing server hardware). Server software is readily available from a variety of vendors in commerce. The computer system can be a personal computer or any computing device capable of executing machine readable program instructions for performing image processing operations through various hardware and/or software applications designed to perform one or more aspects of the present method described above with respect to the flow diagram of FIG. 2.

The networked configuration of FIG. 3 also includes database 316 capable of storing and retrieving data records in response to a query. The database is also capable of adding new data records, updating stored records, and displaying stored data and other information made available by the database engine. Since database construction, query optimization, indexing methods, and record retrieval techniques and algorithms are well known in the arts, a further discussion as to a specific database implementation is omitted. One of ordinary skill would be able to obtain a database engine known in the arts and place the database in communication with any of the computing devices and the printing system. The illustrated implementation is but one configuration. It should be appreciated that database 316 can be placed in communication with any of the devices or modules shown. Values, attributes, recipes, look-up tables, and the like, may reside in database 316.

The image processing system 300 is further shown comprising a target marking device 318. A target marking device is any device capable of reducing a signal of an image of a document to a viewable form. The set of such devices is intended to further include monitors, video displays, LCDs, and the like, such as monitor 319. Reducing an image of a document to a viewable form includes transmitting the image in the form of signals over a network connection, interface, or other communication pathway, for rendering. The step of providing the image to an output device is also intended to include storing those signals for subsequent retrieval.

Image processing module 314 comprises a plurality of modules. Various aspects of image processing module 314 may reside in workstation 302 and/or in the example target marking device 318 and/or within any sub-system thereof. Such sub-systems may comprise a device controller, processor, electronic circuit, ASIC, a software application installed thereon, or the like. Spot color identifier module 320 enables a user to identify at least one spot color of interest for which a spot color recipe is intended to be determined for a target marking device, as described above at step 202 of FIG. 2. Performance attribute selection module 322 effectuates the selection of one or more image quality attributes, as described above with respect to step 204. The performance attribute can further include ink cost reduction with respect to, for instance, target marking device 318. Alternatively, the spot color of interest and/or the performance attribute of interest are received over network 303 or database 316. Destination profile receiving module 324 receives or otherwise retrieves a plurality of destination profiles comprising distinct GCR strategies, as described with respect to step 206. Each of the profiles defines a corresponding candidate recipe. Each candidate recipe defines a device-dependent representation of the selected spot color. Mapping retrieval module 326 receives a mapping which defines a relationship between a device-dependent colorant combination and the selected performance attribute, as described with respect to step 208. The mapping may take the form of a look-up table stored in database 314. Any of the mappings may be received from a remote device via a communication link over network 303. Recipe determination processor 328 determines, from among the candidate recipes, a recipe which optimizes the performance attribute for the spot color of interest based upon the received mapping, as described above with respect to step 210. Determining the recipe comprises determining from the candidate recipes that recipe which yields an optimum value for the selected performance attribute. Determining the recipe may comprise interpolating between candidate recipes to determine a new recipe which yields an optimal value of the performance attribute. Determining the recipe may comprise identifying a subset of recipes, each of which have an image quality performance attribute value which at least meets a pre-determined threshold and then determining, from the identified subset of candidate recipes, at least one recipe which has a minimum ink cost. The identified recipe which yields the optimum value for the selected performance attribute is provided to profile processor module 330 wherein the recipe is processed for use in emulating the identified spot color on target marking device 318. As described above, using the selected recipe may include transmitting the recipe over network 303 or storing the selected recipe to database 316.

The present method will work even with using just existing ICC profiles generated for the printer for other purposes, for example, a high-K profile normally used for spot color emulation and a moderately low-K profile normally used for images. However, to get the full benefit hereof, the set of profiles should be chosen to maximize the range of available CMYK values for all input Lab values. A minimum of 3 profiles is desirable, with one at max-GCR, one at min-GCR and one reasonably between them. A larger number p of profiles in the set will result in more accurate results.

Figure 4:
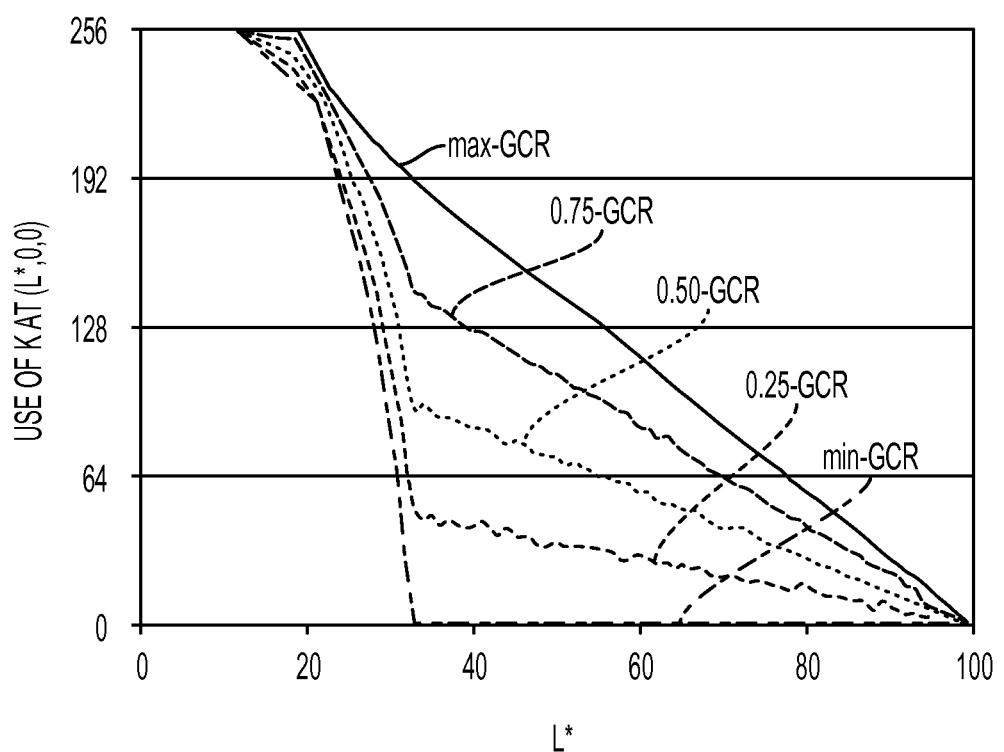
FIG. 4 shows the use of K at neutral for 5 selected ICC destination profiles.

To illustrate the benefit of this method, we conducted tests on printer "B". We used the standard profiling tool to create 5 ICC destination profiles ranging from min-GCR (minimal use of K) to max-GCR (maximal use of K) with near equal spacing of K-usage (see FIG. 4). For this printer, the recommended ICC profile for spot colors is close to a max-GCR profile, while the destination profile for pictorials and graphics is close to a min-GCR profile. We also printed and measured a mottle characterization set ($5^4$ colors at equal c/m/y/k spacing) to build an image quality database, cmyk→M. Here M denotes NMF, the standard Xerox mottle metric. Given these candidate destination profiles and mottle database, we can now assess the smoothness benefit of this method. Here we have P=5 corresponding to 5 destination profiles and s=1124 for the entire set of 1124 colors (1114 Pantone PMS colors and 10 process colors) in the current Pantone reference swatch book. Using a conservative approach which only selects among the results from the 5 existing destination ICC profiles), we can improve as much as 16 units of NMF for some colors (e.g. PANTONE Cool Gray 7 C) when compared to the current method (using max GCR for spot colors). There are 117 colors that have a mottle improvement of more than 3 NMF units (10% of all Pantone colors or ~20% of all in-gamut Pantone colors). There are 251 colors that have more than 1 NMF improvement. These improvements can be significant.

In the next several drawings (FIGS. 5 to 8), we show how the present method can reduce mottle while minimizing total ink consumption. These figures plot the total ink consumption, given by the sum of C+M+Y+K and mottle, represented by NMF as functions of the GCR strategies represented by the five different ICC profiles presented in FIG. 4. This is done for several Pantone PMS colors, which have been selected to show particular features. The total ink amount represents ink cost, and should be minimized. The mottle is objectionable and should also be minimized. The total ink consumption always decreases with increasing ICC Profile number, since the profiles are arranged in terms of increasing K content. However, the mottle behavior varies widely between the different spot colors.

Figure 5:
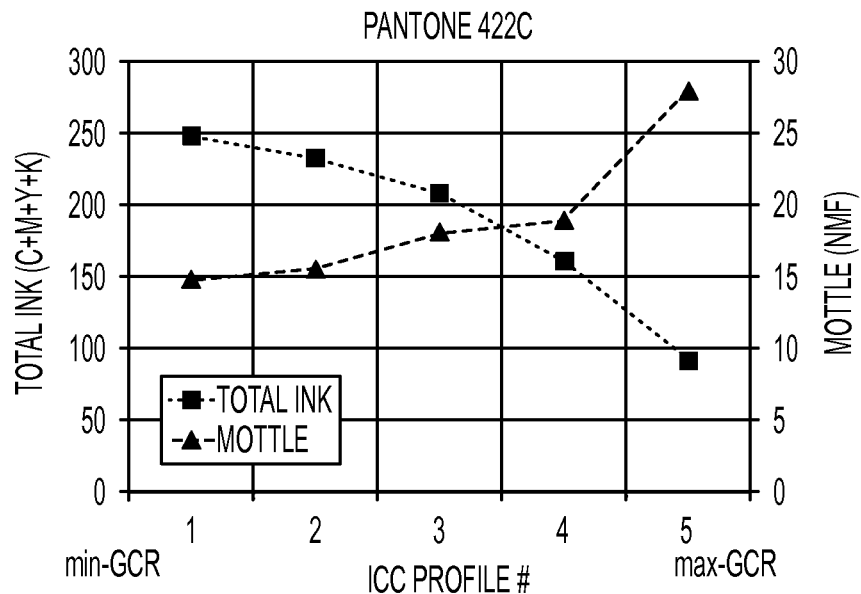
FIG. 5 shows total ink consumption and mottle for Pantone 422 C with recipes derived from 5 ICC destination profiles.

FIG. 5 shows the total ink consumption and mottle for Pantone 422 C. Note that mottle increases with increasing ICC Profile number while total ink consumption decreases. Consequently, a trade-off needs to be made between these two properties. If reduction of mottle (i.e., high image quality) is the primary consideration, minimum K (ICC Profile #1) must be used for this color, but this comes at increased ink cost. As stated earlier, max K is typically used for all spot colors in current practice, leading to significantly higher mottle than is possible. The mottle behavior shown in FIG. 5 is representative of most of the spot colors, but there are many important exceptions, as shown in the later figures.

Figure 6:
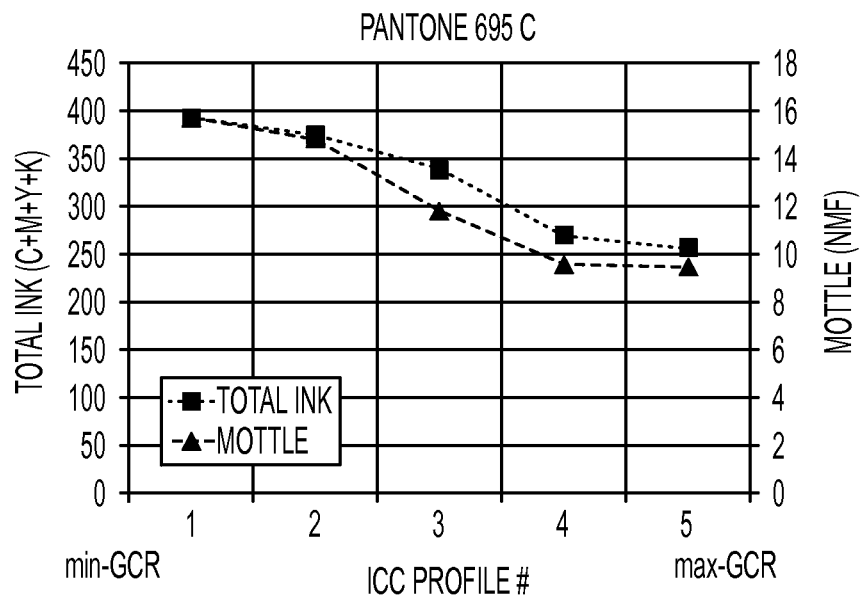
FIG. 6 shows the total ink consumption and mottle for Pantone 695 C. Note that both total ink consumption and mottle decrease with increasing ICC Profile number.

FIG. 6 shows the total ink consumption and mottle for Pantone 695 C. Note that both total ink consumption and mottle decrease with increasing ICC Profile number. Consequently, the max K case (ICC Profile #5) is clearly preferred for this color, since both ink cost and mottle are thereby minimized.

Figure 7:
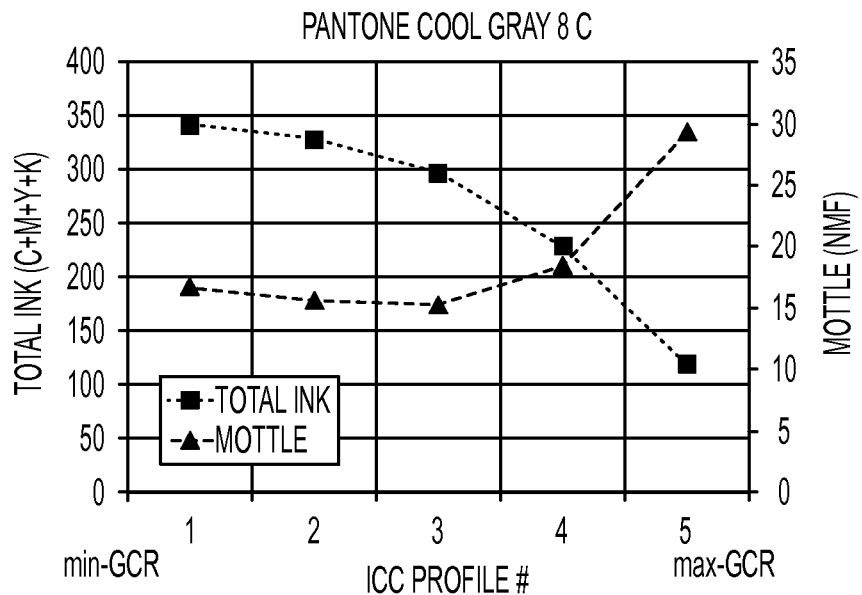
FIG. 7 shows total ink consumption and mottle for Pantone Cool Gray 8 C with recipes derived from 5 ICC destination profiles.

FIG. 7 shows the total ink consumption and mottle for Pantone Cool Gray 8 C. Note that there is a "sweet spot" at mid K (ICC Profile #3) for this color, where mottle is minimized but ink cost is below the maximum level.

Figure 8:
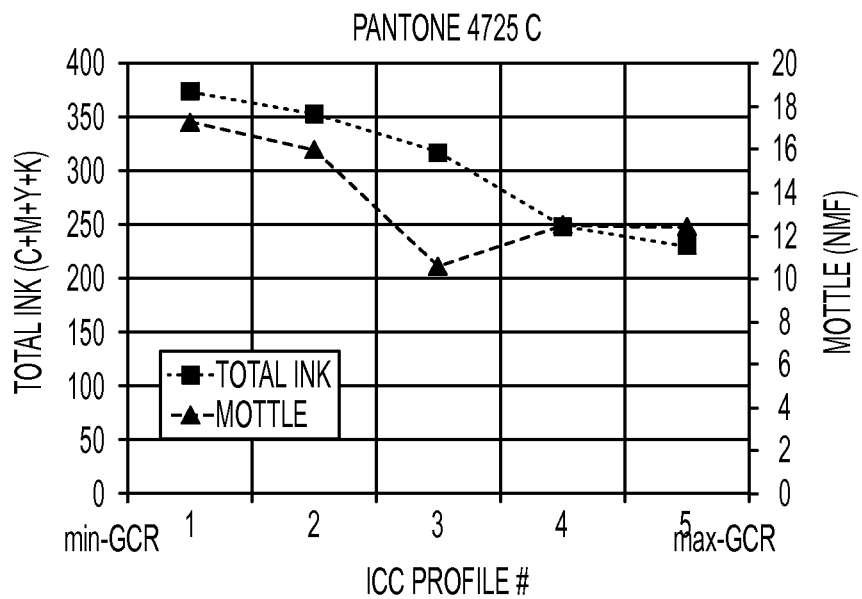
FIG. 8 shows total ink consumption and mottle for Pantone 4725 C with recipes derived from 5 ICC destination profiles.

FIG. 8 shows the total ink consumption and mottle for Pantone 4725 C. Note that there is a similar "sweet spot" at mid K (ICC Profile #3) for this color, similar to Pantone Cool Gray 8 C (FIG. 5) but it is even more prominent.

Example Special Purpose Computer

Figure 9:
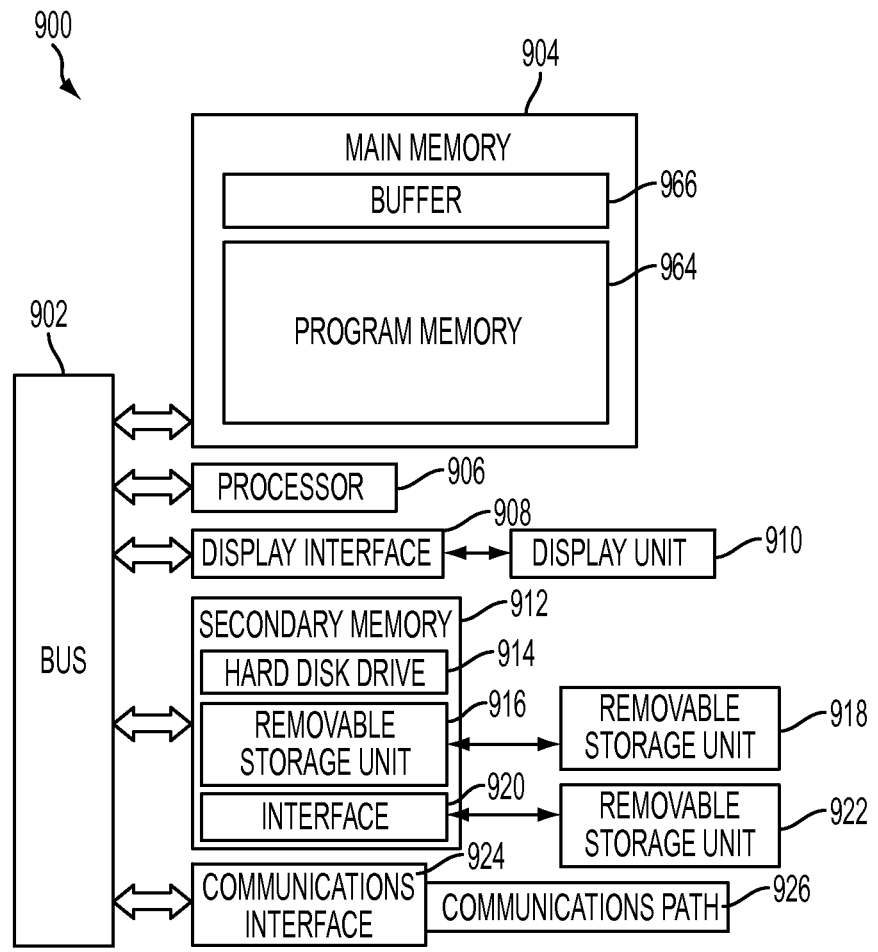
FIG. 9 illustrates a block diagram of one example embodiment of a special purpose computer system for performing one or more aspects of the present system and method as described with respect to the example flow diagram of FIG. 2 and the example functional block diagram of FIG. 3.

Reference is now being made to FIG. 9 which illustrates a block diagram of one example embodiment of a special purpose computer system for performing one or more aspects of the present system and method as described with respect to the example flow diagram of FIG. 2 and the example functional block diagram of FIG. 3. Such a special purpose processor is capable of executing machine readable program instructions for carrying out one or more aspects of the present method and may comprise any of a micro-processor or micro-controller, ASIC, electronic circuit, or special purpose computer system. Such a system can be integrated, in whole or in part, with a xerographic system, color management system, or image processing system, or any of the devices of the networked environment of FIG. 3. All or portions of the flow diagram of FIG. 2 and the functional block diagram of FIG. 3, as illustrated and described herein, may be implemented partially or fully in hardware in conjunction with machine executable instructions in communication with various components of such a system.

Special purpose computer system 900 includes processor 906 for executing machine executable program instructions for carrying out all or some of the various aspects of the present method. The processor is in communication with bus 902. The system includes main memory 904 for storing machine readable instructions. Main memory may comprise random access memory (RAM) to support reprogramming and flexible data storage. Buffer 966 stores data addressable by the processor. Program memory 964 stores program instructions. A display interface 908 forwards data from bus 902 to display 910. Secondary memory 912 includes a hard disk 914 and storage device 916 capable of reading/writing to removable storage unit 918, such as a floppy disk, magnetic tape, optical disk, etc. Secondary memory 912 further includes other mechanisms for allowing programs or other machine executable instructions to be loaded into the processor. Such mechanisms may include, for example, a storage unit 922 adapted to exchange data through interface 920 which enables the transfer of software and data to the processor. The system includes a communications interface 924 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 926 which carries such signals and may be implemented using wire, cable, fiber optic, phone line, cellular link, RF, memory, or other means known in the arts.

It should be appreciated that various of the above-disclosed and other features and functions, or alternatives thereof, may be desirably combined into many other different systems or applications. The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A method for spot color emulation in a color marking device, the method comprising:
    identifying at least one spot color of interest for which a spot color recipe is intended to be determined for a target marking device;
    selecting a performance attribute of interest;
    retrieving a plurality of destination profiles comprising distinct GCR strategies, each of said profiles defining a corresponding candidate recipe, each candidate recipe defining a device-dependent representation of said identified spot color of interest;
    retrieving a mapping which defines a relationship between a device-dependent colorant combination and said selected performance attribute;
    selecting, based on said mapping, at least one candidate recipe which optimizes said performance attribute for said spot color of interest; and
    using said selected recipe to emulate said identified spot color on said target marking device.

2. The method of claim 1, wherein said performance attribute comprises any of the image quality attributes associated with any combination of: graininess, mottle, banding, streaking, color stability, and temporal color variation.

3. The method of claim 1, wherein said performance attribute further includes ink cost reduction.

4. The method of claim 1, wherein said distinct GCR strategies are distributed between a minimum and a maximum GCR strategy.

5. The method of claim 1, wherein said retrieved mapping is in the form of a look-up table.

6. The method of claim 1, wherein selecting said candidate recipe comprises:
- identifying, from among said candidate recipes, a subset of candidate recipes, each of which have an image quality performance attribute value which at least meets a pre-determined threshold; and
- selecting, from among said identified subset of candidate recipes, a candidate recipe which has a minimum ink cost.

7. The method of claim 1, wherein selecting said candidate recipe comprises:
- identifying, from among said candidate recipes, a subset of candidate recipes, each of which have an image quality performance attribute value which at least meets a pre-determined threshold;
- interpolating among said subset of candidate recipes to determine a new recipe which has a minimum ink cost; and
- selecting said determined new recipe.

8. The method of claim 1, further comprising using an iterative method to refine said selected recipe to produce a more accurate spot color recipe for said identified spot color.

9. The method of claim 8, wherein said iterative method includes iteratively printing, measuring, and refining said selected recipe to produce a more accurate spot color recipe for said identified spot color.

10. A system for spot color emulation in a color marking device, the system comprising:
- a memory and a storage medium; and
- a processor in communication with said storage medium and said memory, said processor executing machine readable instructions for performing the method of:
  - identifying at least one spot color of interest for which a spot color recipe is intended to be determined for a target marking device;
  - selecting a performance attribute of interest;
  - retrieving, from said storage medium, a plurality of destination profiles comprising distinct GCR strategies, each of said profiles defining a corresponding candidate recipe, each candidate recipe defining a device-dependent representation of said identified spot color of interest;
  - retrieving, from said storage medium, a mapping which defines a relationship between a device-dependent colorant combination and said selected performance attribute;
  - selecting, based on said mapping, at least one candidate recipe which optimizes said performance attribute for said spot color of interest; and
  - using said selected recipe to emulate said identified spot color on said target marking device.

11. The system of claim 10, wherein said performance attribute comprises any of the image quality attributes associated with any combination of: graininess, mottle, banding, streaking, color stability, and temporal color variation.

12. The system of claim 10, wherein said performance attribute further includes ink cost reduction.

13. The system of claim 10, wherein said distinct GCR strategies are distributed between a minimum and a maximum GCR strategy.

14. The system of claim 10, wherein said retrieved mapping is in the form of a look-up table.

15. The system of claim 10, wherein selecting said candidate recipe comprises:
- identifying, from among said candidate recipes, a subset of candidate recipes, each of which have an image quality performance attribute value which at least meets a pre-determined threshold; and
- selecting, from among said identified subset of candidate recipes, a candidate recipe which has a minimum ink cost.

16. The system of claim 10, wherein selecting said candidate recipe comprises:
- identifying, from among said candidate recipes, a subset of candidate recipes, each of which have an image quality performance attribute value which at least meets a pre-determined threshold;
- interpolating among said subset of candidate recipes to determine a new recipe which has a minimum ink cost; and
- selecting said determined new recipe.

17. The system of claim 10, further comprising using an iterative method to refine said selected recipe to produce a more accurate spot color recipe for said identified spot color.

18. The system of claim 17, wherein said iterative method includes iteratively printing, measuring, and refining said selected recipe to produce a more accurate spot color recipe for said identified spot color.

* * * * *